US012540054B2

(12) United States Patent
Cortona et al.

(10) Patent No.: US 12,540,054 B2
(45) Date of Patent: Feb. 3, 2026

(54) METHOD FOR THE DIGITAL DOCUMENTATION AND SIMULATION OF COMPONENTS IN A PERSONNEL TRANSPORT INSTALLATION

(71) Applicant: INVENTIO AG, Hergiswil (CH)

(72) Inventors: Elena Cortona, Zürich (CH); Frankie Schmid, Ebikon (CH)

(73) Assignee: INVENTIO AG, Hergiswil (CH)

( * ) Notice: Subject to any disclaimer, the term of this patent is extended or adjusted under 35 U.S.C. 154(b) by 870 days.

(21) Appl. No.: 17/793,301

(22) PCT Filed: Jan. 4, 2021

(86) PCT No.: PCT/EP2021/050020

§ 371 (c)(1),
(2) Date: Jul. 15, 2022

(87) PCT Pub. No.: WO2021/144157

PCT Pub. Date: Jul. 22, 2021

(65) Prior Publication Data

US 2022/0411229 A1 Dec. 29, 2022

(30) Foreign Application Priority Data

Jan. 16, 2020 (EP) .................................... 20152260

(51) Int. Cl.

*B66B 19/00* (2006.01)
*B66B 5/00* (2006.01)
*B66B 19/06* (2006.01)

(52) U.S. Cl.

CPC .......... *B66B 19/007* (2013.01); *B66B 5/0018* (2013.01); *B66B 19/06* (2013.01)

(58) Field of Classification Search

CPC ...... B66B 19/007; B66B 5/0018; B66B 19/06

(Continued)

(56) References Cited

U.S. PATENT DOCUMENTS 9,033,114 B2 * 5/2015 Mizon .................. B66B 1/3492 187/394
2015/0049187 A1 2/2015 Van der Sluijs et al.

(Continued)

FOREIGN PATENT DOCUMENTS

CN 104703904 A 6/2015
CN 107848768 A 3/2018

(Continued)

OTHER PUBLICATIONS

Novacek et al. (WO 2019219553 A1) Method and Apparatus for Monitoring a State of a Passenger Transport System by Using a Digital Double (Year: 2019).*

(Continued)

*Primary Examiner* — Jorge L Carrasquillo
(74) *Attorney, Agent, or Firm* — Knobbe, Martens, Olson & Bear, LLP

(57) ABSTRACT

The application relates to a method for the digital documentation and simulation of a passenger transport installation using a detection apparatus. Connection components are installed using a tool of the detection apparatus, the detection apparatus measuring the position and installation parameters of said components during installation, and these data being entered as installation data records in a position-defined manner into a digital twin data record mapping the physical passenger transport installation.

16 Claims, 2 Drawing Sheets

(58) Field of Classification Search
USPC .......................................................... 187/393
See application file for complete search history.

(56) References Cited

U.S. PATENT DOCUMENTS

| | | | | |
|---|---|---|---|---|
| 2015/0158694 | A1* | 6/2015 | Finschi | B66B 1/2458 700/275 |
| 2020/0283263 | A1 | 9/2020 | Studer et al. | |

FOREIGN PATENT DOCUMENTS

| | | | |
|---|---|---|---|
| CN | 110352173 | A | 10/2019 |
| CN | 110418760 | A | 11/2019 |
| EP | 3377436 | B1 | 8/2019 |
| JP | 2013-220917 | A | 10/2013 |
| JP | 2018-037026 | A | 3/2018 |
| JP | 2018-526656 | A | 9/2018 |
| WO | WO 2017085238 | A1 | 5/2017 |
| WO | WO 2019115378 | A1 | 6/2019 |
| WO | WO 2019115380 | A1 | 6/2019 |
| WO | WO 2019219553 | A1 | 11/2019 |

OTHER PUBLICATIONS

Studer et al. (WO 2017085238 A1) Method for Determining Information Relating to Lift Components Received in a Lift Shaft (Year: 2017).*

Novacek (WO 2019115380 A1) Method and Device for Commissioning a Passenger-Transportation Installation to Be Manufactured, by Creation of a Digital Replica (Year: 2019).*

Burri et al. (SG 11202104144Y A) Method for Exchanging a Component in a Passenger Transport System and Device to Be Used in Said Method (Year: 2019).*

International Search Report for International Application No. PCT/EP2021/050020 dated Apr. 28, 2021.

* cited by examiner

METHOD FOR THE DIGITAL DOCUMENTATION AND SIMULATION OF COMPONENTS IN A PERSONNEL TRANSPORT INSTALLATION

TECHNICAL FIELD

The present disclosure relates to a method for the digital documentation and simulation of components installed in a passenger transport installation.

SUMMARY

Passenger transport installations within the meaning of the present document are configured as escalators, moving walkways or elevators. These are generally used to be able to transport people or objects within a building. Elevators usually connect several floors of the building. Escalators and inclined moving walkways usually connect two floors of the building, while horizontal moving walkways are located on the same floor.

In the case of elevators, an elevator shaft or installation space is provided in the building or on the outside of the building, within which shaft or space mobile components of the elevator, such as one or more elevator cars, a counterweight or the like, can be moved. The moveable components are usually moved by suspension means such as cables or belts, which in turn are moved by a traction sheave driven by a motor. There are also elevators that are hydraulically operated.

In addition to the movable components mentioned, a large number of static components of the elevator are usually arranged in the elevator shaft. For example, guide rails can be firmly anchored in the elevator shaft, along which the movable components can be moved in a guided manner A buffer is usually provided at the bottom of the elevator shaft in order to prevent the elevator car from hitting the ground hard, for example in the event of a malfunction or a defect in the elevator installation. A drive unit is provided near a ceiling of the elevator shaft or in a separate machine room of the building, which drive unit drives the suspension means, for example, and thereby moves the mobile components attached to these suspension means within the elevator shaft. On different floors of the building, doors that can be moved automatically are usually provided in the elevator shaft, which doors can open access to the elevator car stopped on a specific floor and can block this access as soon as the elevator car moves away from this floor. Additional safety-relevant elevator components such as sensors, switches, detectors, emergency braking devices, evacuation devices and the like can also be arranged in the elevator shaft. Due to their size and close connection to the building structure, elevators are usually broken down into components and brought into the building and installed there. In other words, when installing an elevator, it is not installed as a whole in the installation space provided for this purpose, but its components are assembled at the designated locations in the elevator shaft and the elevator installation is thus built up successively in the elevator shaft.

Escalators have a step band and moving walkways have a pallet band that can be entered via a first access region and exited via a second access region. Balustrades with circulating handrail belts are arranged on the side of the step belt or pallet belt. Furthermore, there is a drive unit, a controller and optionally additional safety-relevant components such as sensors, switches, detectors and emergency braking devices. All of these components are arranged in and on a supporting structure, which is supported at least at two bearing points of the building. It is common practice to completely assemble and pack an escalator or moving walkway at the manufacturing plant and to transport it to the intended place of use and to install it in the building there. An escalator or a moving walkway can be installed as a whole in a building, but these passenger transport installations are usually so long that they are divided into sections at the manufacturing plant after functional testing and these sections are then packed for shipping. However, depending on the design of the building and the escalator or moving walkway, it may also be the case that these components are dismantled, delivered and successively assembled in the building. This is particularly the case when modernizing escalators and moving walkways, where the supporting structure of the passenger transport installation previously used is still used.

Mechanical connection components such as anchors, screws, clamping and tensioning elements and material connection components such as adhesive points or welds are used to assemble the components of passenger transport installations, the correct application of which depends heavily on the fitter doing the application. However, it is precisely the quality of the application of connection components that can have a strong impact on the quality of the installed passenger transport installation in terms of its smooth running, its wear resistance, its energy consumption, its noise emissions and the like.

When installing a passenger transport installation for the first time and optionally during subsequent maintenance or modernization of an existing passenger transport installation, it is therefore common practice for many manufacturers or operators to subsequently carry out an inspection or final acceptance of the components of the passenger transport installation installed in the building and to record the results in a log. Such an inspection usually comprises at least a note of serial numbers and the type of components included and documentation of their proper installation. In the case of safety-relevant components of a passenger transport installation, a certificate number is usually also recorded and function tests are carried out.

The inspection or logging process has so far mostly been carried out manually by a person such as a suitably qualified and certified fitter, with this person inspecting a huge number of the components of the passenger transport installation accommodated in the building, comparing them with target specifications, and creating a corresponding log. This can lead to safety-related errors in the documentation of the installation and/or maintenance of the passenger transport installation. Errors in the documentation of the installation can also result in a considerable amount of additional work and associated longer downtime periods and higher costs when maintenance is carried out later on.

Patent EP 3 377 436 B1 describes a method in which the operating states of elevator components in an elevator shaft can be read out automatically in order to be able to log them and compare them with the target specifications. However, this type of logging only allows a rudimentary comparison with the target specifications and no further considerations, such as those that would have to be carried out in the case of assembly errors. In addition, each component that is to be installed must already have a clear marker, even if this is bulk material, such as screws, pins, bolts, nuts, etc. used as connection components. Marking such connection components is a considerable effort for production and logistics.

The object is therefore that of specifying a method and a detection apparatus for the digital documentation of installed components of a passenger transport installation which allows further considerations and is also more inexpensive.

This object is achieved by the detection apparatus described below and by the method to be carried out using this detection apparatus for the digital documentation and simulation of a passenger transport installation. The detection apparatus comprises at least the following elements:

a central position analysis device;

at least one local position detection device;

at least one portable tool having technical means for recording data from connection components installed with this tool, together with their position and parameters which are measured by the portable tool during installation; and a central data storage and data processing unit in which parameters for the documentation and simulation of the passenger transport installation are stored.

The method to be carried out using this detection apparatus comprises at least the steps whereby a communication connection is set up between the tool, the at least one local position detection device, the central position analysis device and the central data storage and data processing unit. As soon as these communication connections are set up, using data of the installed connection components which are transmitted from the tool via the at least one local position detection device and the central position analysis device to the central data storage and data processing unit, installation data records are generated. In this case, an installation data record comprises at least one identifier for the assigned, installed connection component, its measured position and the installation parameters measured by the tool during installation of this connection component. These installation data records are entered in a position-defined manner into a digital twin data record which maps the physical passenger transport installation. This creates direct links between the installation parameters and the components influenced thereby, which is the only way to allow sufficiently precise documentation of the installation that grows continuously with the progress of the installation and thus error-free documentation and meaningful simulation.

Of course, the components that are connected to one another by this connection component and/or to fastening points formed on the building can also be detected here. In most cases, these components already have a unique, electronically recordable identifier such as a barcode, a matrix code, a serial number, an RFID tag and the like, which can also be detected by the tool or by a separate device. If necessary, there is also the possibility of assigning an identifier to the component using the tool, without this being physically recorded on the connection component.

Since the position of the connection component is detected by the tool, the exact positions of the connected components in space are also defined at the same time and can thus also be entered or adjusted accordingly in the digital twin data record.

As mentioned above, a digital twin data record is provided for documentation and simulation. The generation of the digital twin data record comprises at least the following steps, preferably, but not necessarily strictly, in the order given:

(i) creating a commissioning digital twin data record from customer-specific configuration data and component model data records with target data which reproduce characterizing properties of components of the passenger transport installation in a target configuration;

(ii) creating a production digital twin data record based on the commissioning digital twin data record by measuring actual data which reproduce characterizing properties of components of the physical passenger transport installation immediately after production thereof and replacing target data in the commissioning digital twin data record with corresponding actual data; and (iii) creating and continuously updating the digital twin data record based on the production digital twin data record by modifying the production digital twin data record during assembly of the physical passenger transport installation, taking into account data recorded by the detection apparatus which reproduce at least the determined identifiers for the installed connection components, their measured position and their measured installation parameters.

The digital twin data record is created and continuously updated in particular by these installation data records being transmitted to the digital twin data record and the characterizing properties of the component model data records affected by the transmitted data being updated accordingly. At this point it should be mentioned that the provided connection components are also mapped as component model data records in the digital twin data record.

In other words, the digital twin data record can be created and updated in several sub-steps. The data contained in the data record can thus be successively improved and refined so that the characterizing properties of the components installed in the physical passenger transport installation are reproduced more and more precisely with regard to their actual current configuration in the digital twin data record with continuous creation and, with continuous assembly of the physical passenger transport installation, the digital twin data record is completed with regard to the documentation and usable data for a simulation.

This means that the installation data records recorded during assembly and entered into the digital twin data record can also influence at least one characterizing property of at least one component model data record, or this characterizing property of the component model data record must be updated accordingly. As explained in greater detail below in connection with the drawings, the installation data record usually relates to a plurality of characterizing properties of several component model data records. By means of simulations, changes of each of these characterizing properties can be calculated for each affected component model data record from the recorded data of the tool using the geometric relationships available in the digital twin data record, the physical properties stored in the component model data records, and known calculation methods from the fields of physics, mechanical engineering and the science of strength of materials. The changed characterizing properties of the affected component model data records determined on the basis of the detected changes can now be assessed to determine whether the assembly was carried out correctly or not at this point. In concrete terms, for example, if a screw is tightened too much, a plastics damping element that is also compressed therewith could be damaged. Corresponding simulations can be carried out with the data measured by the tool, which are transferred to the digital twin data record as the installation data record.

With regard to the previous example, due to the position detection described, it is also unambiguously clear which damping element has to be replaced before the physical passenger transport installation is put into operation due to the faulty assembly. In this way, consequential damage to other components that might occur during startup can be avoided. In addition, the components damaged by the faulty assembly could also affect adjustments made to the passenger transport installation before or during startup, which could lead to higher energy consumption and higher wear during subsequent operation, for example.

The documentation and simulation of the components is carried out in the same way for all passenger transport installations, although these components are detected in an installation-specific manner. The differences between escalators, moving walkways and elevators are the choice of data fields and the simulation of the technical processes.

In other words, the adaptation of the digital twin data record consists in a suitable selection of the data fields of the installation data records, which reproduce the technical parameters of a specifically assigned passenger transport installation, the identifier for an installed connection component, its measured installation position, the measured installation parameters such as the breakaway torque when installing the connection component, its dimensions or dimensional changes and the like, as well as the documentation of the installation, for example using camera recordings, with all these parameters usually being collected or measured by a portable tool. The entered data, together with the data from the customer specification, the component model data records compiled therefrom and from production, form the digital twin data record that consistently describes the passenger transport installation.

In other words, the documentation includes a digital twin data record which, in an installation-specific manner, comprises as far as possible all the data of each intended part or each component that occurs during the design and production. The spatial and physical relationships between these data fields are thus created by the digital twin data record, which describes and defines the spatial arrangement of the components forming the passenger transport installation or their component model data records with respect to one another, the corresponding data fields being assigned to the component model data records concerned and their interfaces.

The adaptation of the simulation on the data storage and data processing unit consists in simulating the behavior, the forces and moments of an installed connection component, in particular in interaction with the component model data records of the other physical components of the passenger transport installation. This allows material changes and stresses that are outside predefined tolerance ranges to be determined, so that safety-critical states can be avoided proactively, i.e. before a component or unit fails.

Described in more detail, the following method steps can be carried out during the installation or assembly of the physical components of the passenger transport installation with the detection apparatus:

S1 setting up a first communication connection between the central position analysis device and the central data storage and data processing unit;

S2 setting up a second communication connection between the central position analysis device and the at least one local position detection device, each local position detection device being uniquely assigned to a central position analysis device; and

S3 setting up a third communication connection between the local position analysis device and the at least one tool;

S4 assembly of at least one component of the passenger transport installation in the building provided for this purpose by means of a connection component using the tool;

S5 determining an identifier by automatically assigning or, if present, by detecting a marker of the connection component for the installed connection component by means of the tool, and measuring installation parameters by means of the tool and measuring the installation position of the connection component by means of the local position detection device during installation;

S6 documentation of the installation process by means of the tool;

S7 compiling an installation data record, which comprises the identified identifier for the installed connection component, its measured position, the measured installation parameters and the documentation of the installation process, in at least one local position detection device associated with the portable tool;

S8 transmitting the installation data record from the at least one local position detection device to the central position analysis device via the second communication connection;

S9 transmitting the installation data records from the central position analysis device to the central data storage and data processing unit via the first communication connection;

S10 position-defined entry of the installation data records and the associated metadata, in particular log data, into the fields provided therefor in the digital twin data record of the passenger transport installation, which is provided for this purpose on the central data storage and data processing unit.

The structure of the first, second and third communication connections can be technically implemented in both a wireless and wired manner. It is only important that each local position detection device is uniquely assigned to a central position analysis device. The separation between the first and second communication connections allows one communication connection to be wireless and the other to be wired. This separation also allows a switch between wireless communication technologies such as Bluetooth, NfC, infrared, RFID, Wi-Fi, wireless HART, wireless USB or ZigBee depending on the geometric and electrical conditions and restrictions in the installation shafts of elevators or the room conditions in escalators and moving walkways. The separation between the communication connections also offers the possibility of aggregating the installation data records in the local position detection devices before further data transmission. The first communication connection can also be set up via a communication component of the passenger transport installation. This has the advantage that the data recorded by the detection apparatus can also be stored in a data storage unit of the passenger transport installation. As a result, these data are unmistakably linked to the physical passenger transport installation and can be retrieved there again and again. It may be advantageous if these data are stored in a persistent memory (read only memory) of the data storage unit.

Due to the presence of a tool, at least one position detection device and a position analysis device, there are at least three points in three-dimensional space, the distances and angles between which can be measured with high precision and the coordinates or the installation position of the assembled connection component can thus be precisely determined. Here, for example, the position analysis device can serve as a temporary reference zero point, starting from which the installation positions of all installed connection components and thus all installed components of the passenger transport installation can be determined and entered into the digital twin data record. In order to measure the distance and position angle, propagation times of radio signals can be evaluated, or laser measuring devices, TOF image acquisition systems and the like can be used. In principle, all known measuring systems can be used with which the position of a predetermined point of the connection component relative to a predefined reference point in the installation space of the passenger transport installation can be measured with sufficiently high precision, for example to a tenth of a millimeter for the direction vector to be detected in three-dimensional space.

Furthermore, the detection apparatus can comprise at least one removable, portable display device for assisting the assembly personnel. The portable display device may be a tablet, a laptop, a smartphone or VR (virtual reality) glasses, for example. Together with the elements of the detection apparatus described above, the following method step can be carried out, supplementing method step S4:

S4A displaying an activity to be carried out by a fitter on the portable display device, this activity taking place using the portable tool and a connection component on the basis of an assembly specification, which assembly specification is stored in the central data storage and data processing unit as part of the digital twin data record of the passenger transport installation.

As is well known, it can hardly be avoided that different connection components that are very similar to one another are required for the assembly of a passenger transport installation. In the case of screws to be installed, this difference can only be the length of the thread, for example. In order to avoid confusion when using different connection components, the detection apparatus can comprise a provision system for connection components. Such a provision system can comprise an output apparatus having an output controller which, also based on the assembly specification, releases or outputs only the relevant connection component to be installed. Together with the elements of the detection apparatus described above, the following method steps can be carried out, supplementing method step S4:

S4B automatically providing the connection component by means of the provision system on the basis of the assembly specification; and

S4C installing the displayed connection component in connection component receptacles, which are provided for this connection component on components of the passenger transport installation or in the building in which the passenger transport installation is installed, by the fitter using the portable tool.

This provision system can be managed using a Kanban production process control approach. The output controller automatically monitors the supply of connection components and, in accordance with the assembly specification, orders the connection components that are still to be installed from the supplier if they fall below a certain number in the provision system.

Furthermore, the following method steps can be carried out using the data of the digital twin data record:

S11 simulation of the behavior, the forces and moments of the installed connection component in interaction with the other components of the passenger transport installation in order to determine material changes and material stresses that are outside predefined tolerance ranges, wherein the simulation takes place on the data storage and data processing unit;

S12 determining correction work based on the determined material changes and material stresses.

The method according to the disclosure thus makes it possible to simulate the effects of a connection component on the installed components immediately after it has been assembled. In other words, the internal stresses caused by the connection component in the region of the connection component receptacles of the components can be calculated, and from this shape changes in the region of these connection component receptacles can be determined. If these do not exceed a permissible range (e.g. the permissible material stress), the assembly is correct. If this is exceeded, the incorrectly assembled connection component or the component damaged thereby can be recognized immediately and replaced at once. As a result of the ongoing logging, as assembly progresses, a final inspection to be carried out after assembly can be omitted or at least be reduced to a minimum, such as certain functional checks. As a result, the assembly quality of the entire passenger transport installation can be decisively increased, and the time required for startup tests and acceptance checks between the completion of the passenger transport installation and handover thereof can be decisively reduced.

In order to structure the flood of data occurring during assembly and to bring it into a form that is consistently comprehensible, the assembly data records can be aggregated on the at least one local position detection device and/or on the central position analysis device. The aggregated data records are then periodically entered into the designated data fields of the digital twin data record. The aggregation also has the advantage that more data transmission and data processing resources are temporarily available for simulation operations.

Preferably, the measuring of the installation position and the installation parameters is technically implemented by means of the portable local position detection device during installation by determining the position of the tool relative to the position of the central position analysis device and/or by determining the current GPS data of the tool during the assembly process. A plurality of position detection devices may also be involved here, so that they measure distances and angles to one another and, based on these data, in the position analysis device, the position of the installed connection component can be calculated with high precision through the precise localization of the installing tool.

As already mentioned above, the installation of a connection component can be documented. In this documentation, not only can the installed state be recorded, but preferably the entire, or at least substantial sequences of the installation process can also be noted. The documentation of the completed installation is preferably camera-based.

In one possible embodiment of the disclosure, the data storage and data processing unit for the documentation and simulation of the passenger transport installation can comprise the design specification, its parameterization, the assembly specification and, for each connection component, data fields for the identifier, for the position, for the measured installation parameters and for the documentation. At least the design specification, its parameterization and the data fields for each connection component are summarized in the digital twin data record. The design specification and its parameterization indicate how and which components of the passenger transport installation, in which spatial position relative to one another and to the building, are to be connected to one another or to parts of the building in order to construct the passenger transport installation defined according to the customer-specific configuration data from these components.

The installation specification contains all the information required for assembling the passenger transport installation in the building. This can include the assembly process, assembly instructions, data for optical pointers, torques, lubricants and dosage thereof and the like. An optical pointer can be integrated in a local position detection device or in a portable tool and can use a laser beam, for example, to mark the exact point at which the connection component to be installed is to be assembled based on the target specifications available from the digital twin data record. Due to the data available from the digital twin data record, there is also the possibility of projecting the components to be assembled with the connection component at the correct place and in the correct position, for example on the shaft wall of the elevator shaft of the building.

The data storage and data processing unit does not necessarily have to be present at the assembly site. This can also be implemented by a remote system, in particular a cloud system.

The method according to the disclosure can be put into practice in a computer program product containing computer-executable instructions for implementing the detection apparatus, which are designed to implement at least method steps S1 to S10. This computer program product may be persistently stored on a computer-readable medium.

A detection apparatus required for carrying out the method can comprise the following elements:

- At least one local position detection device having technical means that are designed to implement the further above-described steps S2 to S8 of the method. This is preferably designed to be portable and removable, so that it only remains at the assembly site during assembly and can be used at a new assembly site after the assembly work has been completed.
- A central position analysis device having technical means that are designed to implement the further above-described steps S1, S8 and S9 of the method. This is also preferably configured to be portable and removable.
- At least one removable, portable display device for assisting fitters. Instructions regarding the assembly step currently to be carried out are transmitted to this display device. Furthermore, the display device can have input options with which assembly steps that have been carried out can be confirmed.
- At least one removable, portable tool WZ having technical means for recording an identifier for installed components VE together with their position and parameters which are measured by the portable tool WZ during installation.
- A central data storage and data processing unit having technical means that are designed to implement the above-described steps S10 to S12. Parameters for the documentation and simulation of the passenger transport installation can also be stored in the central data storage and data processing unit. In order to operate the detection apparatus, a communication connection can be set up between the tool, the at least one local position detection device, the central position analysis device and the central data storage and data processing unit.
- A digital twin data record that contains the design specification, its parameterization, the assembly specification for each connection component and data fields for the identifier, for the position, for the measured installation parameters and for the documentation of each connection component.

In addition, the detection apparatus can comprise a provision system for connection components. The provision system has technical means that are designed to implement steps S4B and S4C of the method. In other words, the provision system can only release the connection component required in each case, which is provided for the upcoming assembly step. As a result, confusion between similar connection components is excluded, assembly steps are precisely structured and the quality of the assembly work is significantly less dependent on the skills of the assembly personnel. As a result, the effort involved in the conformity inspection that follows the completion of the passenger transport installation can be reduced to just a few function tests.

BRIEF DESCRIPTION OF THE DRAWINGS

Embodiments of the disclosure will be described below with reference to the accompanying drawings, with neither the drawings nor the description being intended to be interpreted as limiting the disclosure. The drawings are merely schematic and not true to scale.

DETAILED DESCRIPTION

Figure 1:
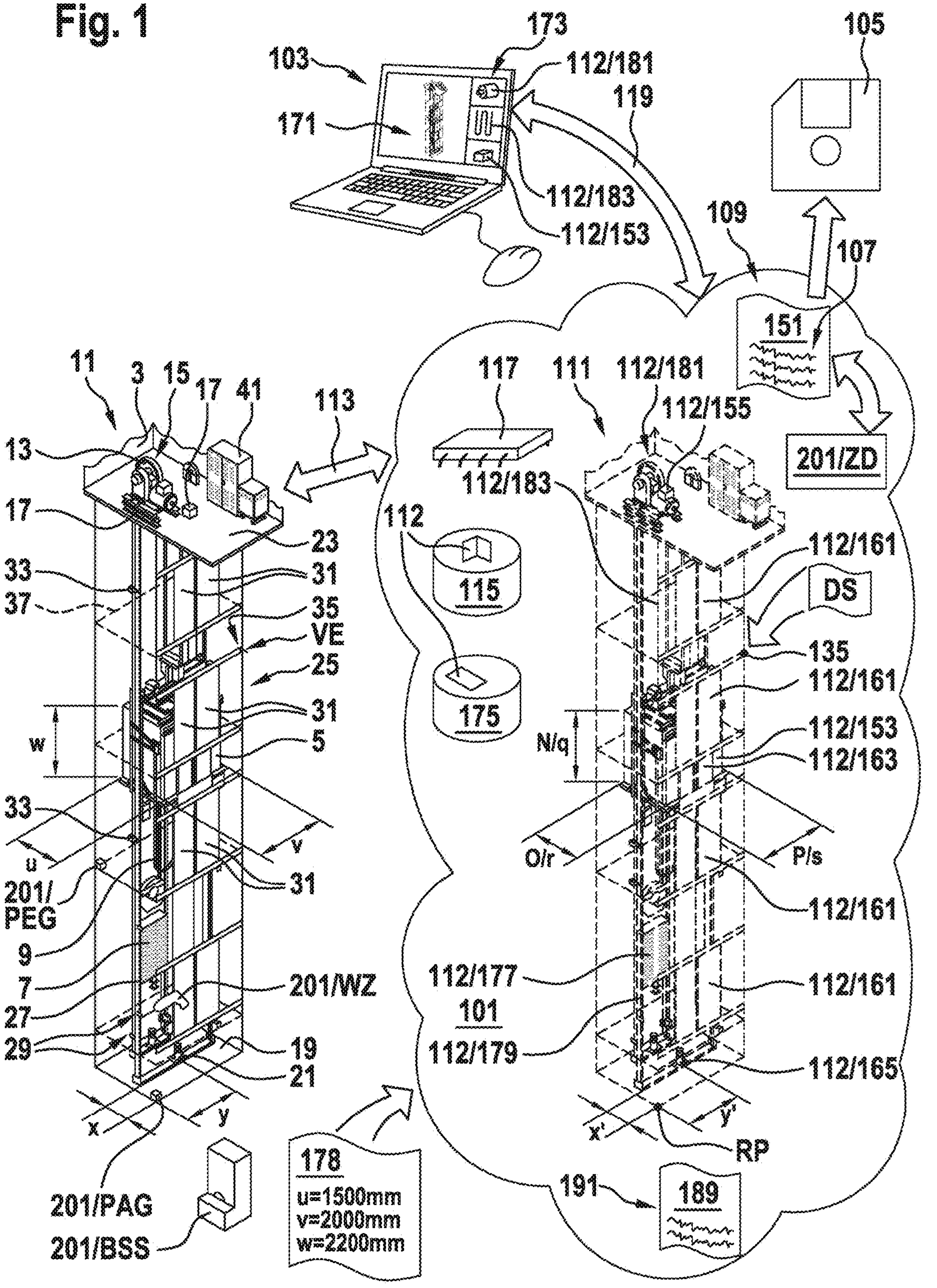
FIG. 1 shows a passenger transport installation designed as an elevator installation having a detection apparatus according to the disclosure for applying a method according to the disclosure, as well as a digital twin data record stored in a data cloud, which maps the elevator installation shown.

FIG. 1 shows a passenger transport installation 11 designed as an elevator installation, in which two movable elevator elements 5, 7 in the form of an elevator car 5 and a counterweight 7 can be moved vertically in an elevator shaft 25. Here, the elevator shaft 25 is the installation area of the passenger transport installation 11 in a building 3. The elevator car 5 and the counterweight 7 are held by a suspension means 9 in the form of one or more belts or cables. The support means 9 can be displaced via a traction sheave 13 of a drive 15 provided with a motor in order to move the elevator car 5 suspended thereon and the counterweight 7 in opposite directions within the elevator shaft 25. The ends of the suspension means 9 are each fastened to fastening apparatuses 17 on a ceiling 23 of the elevator shaft 25.

In addition to the above-mentioned movable elevator components and permanently installed elevator components, a large number of other elevator components are accommodated in the elevator shaft 25. For example, a buffer 21 is provided on a floor 19 of the elevator shaft 25. Guide rails 27 can be fastened to walls of the elevator shaft 25 by means of retaining clips 29 ("brackets"). The guide rails 27 can be used, for example, to guide the elevator car 5 or the counterweight 7 during a vertical movement. Adjacent to floors 37 (indicated by a broken line) of the building 3, shaft doors 31 can be provided, which can provide access to an elevator car 5 stopping on the floor 37. Furthermore, sensors 33 or other parts of a sensor system can be provided in the elevator shaft 25 which can interact with corresponding counterparts, for example on the elevator car 5, in order to be able to determine an exact position of the elevator car 5 within the elevator shaft 25, for example. The sensors 33 and the counterpart thus form a position measuring unit for the position of the elevator car 5. In addition to the elevator components mentioned by way of example, further elevator components can also be arranged in the elevator shaft 25.

According to the disclosure, a digital twin data record 111 maps the passenger transport installation 11 before its physical components have been manufactured and assembled in the building 3 in the correct position and orientation. The digital twin data record 111 thus accompanies the entire product life cycle of the passenger transport installation 11 from planning through assembly and operation to its disposal. The data for the digital twin data record 111 can be present, for example, as a CAD data record 112 which, among other things, reproduces, as characterizing properties, geometric dimensions and/or other characterizing properties of the components forming the passenger transport installation 11.

In this case, customer-specific configuration data 178 required for planning are used, which have been created by the customer or in cooperation with the customer. Such customer-specific configuration data 178 comprise, for example, the desired transport capacity, the number of floors 37 and the floor heights, the dimensions of the planned or available elevator shaft 25 and the width v, depth u and height w of the elevator car 5 that can be derived therefrom. Customer-specific configuration data 178 can thus be understood to mean specifications that are specified by the customer on a case-by-case basis, for example when ordering the passenger transport installation 11 to be created. The customer-specific configuration data 178 typically relate to a single passenger transport installation 11 to be produced. For example, the customer-specific configuration data 178 can comprise prevailing spatial conditions at the installation location, interface information for attachment to supporting structures of the building 3, etc. Customer-specific configuration data 178 can also comprise customer wishes with regard to functionality, conveying capacity, optics, etc.

In addition, the components of a planned passenger transport installation 11 are specially selected during its design in order to be able to meet the requirements and/or regulations specified for the specific passenger transport installation 11. For this purpose, each component is precisely specified with regard to, for example, its type and mode of operation and, for example, a specific design type of a component such as a retaining clip 29 is selected for the specific application.

The digital twin data record 111 of the passenger transport installation 11 can be constructed from component model data records 112 using a computer program 189 and stored in a storage medium 115, the component model data records 112 being able to have different configurations and being defined by characterizing properties. Each characterizing property of a component model data record 112 is predefined by a default value, by a target value, or by an actual value. A component model data record 112 usually depicts a physical component in its entirety, i.e. the information that provides the characterizing properties reproduces the physical component in virtual form as precisely as possible. In other words, the characterizing properties can relate to individual components of which larger, more complex component groups are composed.

The creation of the digital twin data record 111 can take place automatically, as long as a clear selection of the component model data records 112 is possible on the basis of the customer-specific configuration data 178. As soon as a selection between different, similar components or component model data records 112 mapping said components is possible, the available component model data records 112 of components of a passenger transport installation 11 can, for example via a graphical user interface 173 of an input interface/output interface 103 such as the laptop shown, be selected from one or more databases 115, 175 and entered into the digital twin data record 111 via predefined interfaces 135. Standard components of elevator installations 11 depicted in the database 175 as component model data records 112—such as various counterweight component model data records 177, guide rail component model data records 179, shaft door component model data records 161, car door component model data records 163, drive component model data records 181 and suspension means component model data records 183 in various suspension means guide variants—can be available for selection. Logically, a virtual image 171 of the digital twin data record 111 can also be displayed on the input interface/output interface 103.

Figure 2:
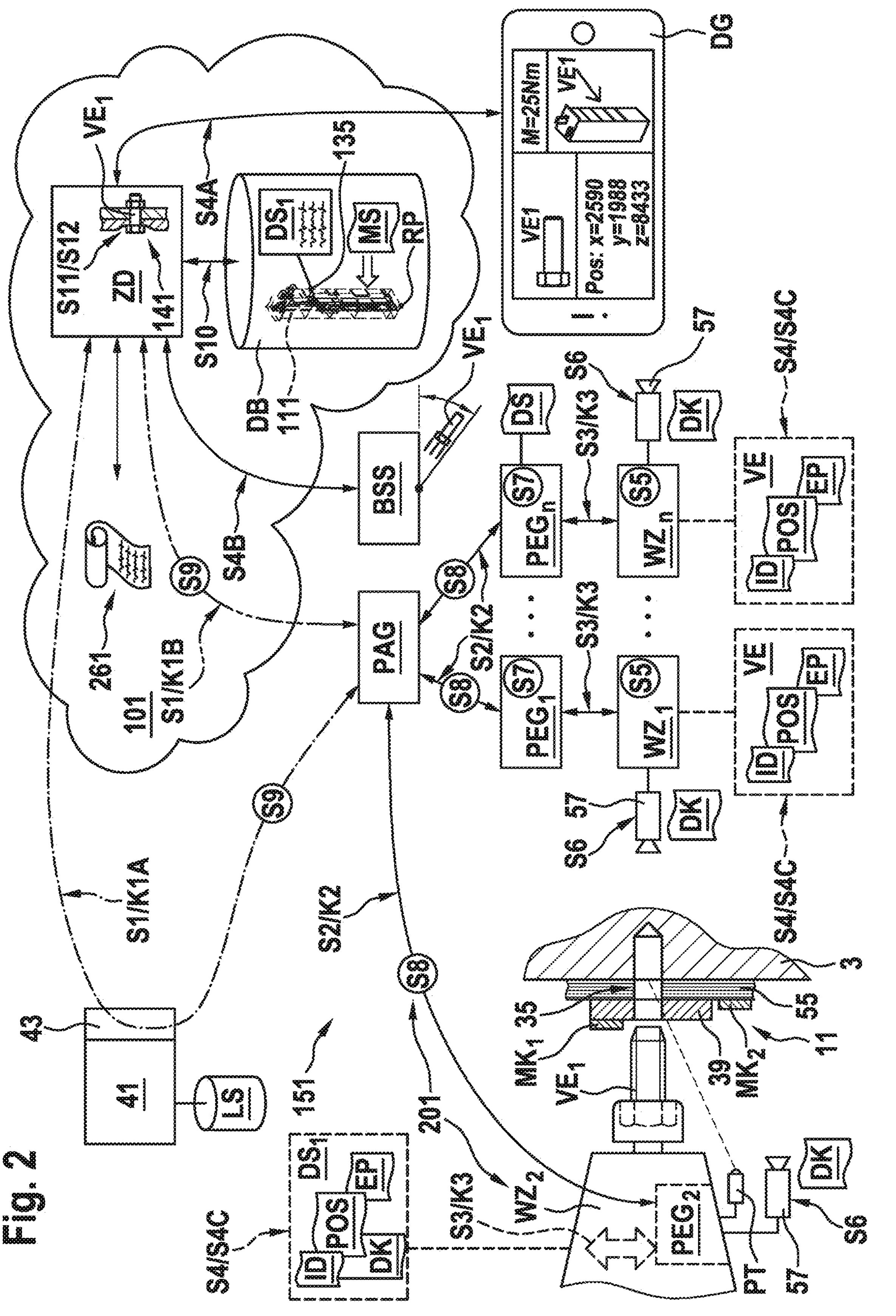
FIG. 2 describes the elements of the detection apparatus and its communication connections and communication networks within the detection apparatus shown in FIG. 1 and their interaction, divided into steps S1 to S12.

The predefined interfaces 135 are characterizing properties which define coordinates on the component model data record 112 in three-dimensional virtual space, at the location of which they can be connected to other component model data records 112 using the recorded data or installation data records DS of connection components VE (see also FIG. 2). The target data of these predefined interfaces 135 generated for the digital twin data record 111 are generated and processed by machine-readable instructions 191 in particular when the digital twin data record 111 is created, so that, taking into account the customer-specific configuration data 178 and a configurable master assembly plan (product-specific generative assembly plan and parts list) implemented in the machine-readable instructions 191, each selected component model data record 112 and thus all component model data records required for forming the digital twin data record 111 can be correctly arranged in three-dimensional, virtual space in a target configuration relative to one another.

Characterizing properties of a component model data record 112 within the meaning of the present disclosure can be geometric dimensions q, r, s, surface properties, physical properties, dynamic properties and the like of the component mapped thereby, as shown in the example of a car component model data record 153. Geometric dimensions may be, for example, a length, a width, a height, a cross section, radii, fillets, etc. of the components. The surface quality of the component can include, for example, roughness, textures, coatings, colors, reflectivities, etc. Physical properties may be weight or material density, modulus of elasticity, conductivity, moment of inertia, bending strength value and the like. Dynamic properties can be degrees of freedom of motion associated with the component model data record, speed profiles and the like.

However, the characterizing properties can relate not only to individual components, but also to component groups in self-contained subsystems. In other words, the characterizing properties may also refer to more complex equipment composed of a plurality of components, such as drive motors, gear units, suspension means 9, etc. In the course of the product life cycle of a passenger transport installation 11, the characterizing properties of its digital twin data record 111 can change from default values to target values to actual values.

Default values within the meaning of the present disclosure are values which predefine the characterizing properties of a component model data record 112. This means, for example, that a default value of a component model data record 112 configured as a guide rail component model data record 179, which maps a guide rail 27, defines a standard length in the sense of a placeholder. The cross-sectional shape of this guide rail component model data record 179 can also be predefined by default values. It is now obvious that the characterizing property of the guide rail component model data record 179, which represents the length of the guide rail 27, has to be adapted when the digital twin data record 111 is created, while the cross-sectional shape may already have been sufficiently defined by the default values.

The information taken from the manufacturer's specifications is also often sufficient as default values for characterizing properties that reproduce the material-specific properties of a component, such as its modulus of elasticity, its impact strength and the like.

Target values within the meaning of the present disclosure are values that define the characterizing properties of a component model data record 112 in a target configuration. Such target values are usually defined by the customer-specific configuration data 178 for a planned passenger transport installation 11 or can be calculated on the basis thereof. For example, in the case of the car component model data record 153, the width s, the depth r and the height q of the elevator car are calculated from the desired transport capacity of the passenger transport installation 11, which is recorded in the customer-specific configuration data 178.

In the case of the above-mentioned component model data record 112 configured as a guide rail component model data record 179, the default value thereof for the length, which is defined as a standard length in the sense of a placeholder, is now replaced by a target value that is specified by the customer-specific configuration data 178. If necessary, the target value is also provided with a tolerance specification.

Actual values within the meaning of the present disclosure are values that have been determined on the physical component, which is virtually mapped by the component model data record 112 and has been produced according thereto, by measuring, checking and testing. In the case of the car component model data record 153, the desired values defining its characterizing properties, width s, depth r and height q, are now modified by the measured width P, the measured depth O and the measured height N.

The more characterizing properties of a component model data record 112 are defined by an actual value, the more precise the simulation environment is overall and the more precisely the effects of the assembly work on the components of the assembled passenger transport installation 11 can be determined in the simulation environment. For the reasons mentioned above, the component model data records 112 of the digital twin data record 111 serving as the simulation environment can be characterized in a mixed manner by default values, target values and actual values. The close and one-to-one relationship between the digital twin data record 111 and the physical passenger transport installation 11 is symbolized by the double arrow 113.

The digital twin record 111 can be created and used by means of a programmable apparatus 101. The programmable apparatus 101 may be a single device such as a personal computer, a laptop, a mobile phone, a tablet, or the like. However, the programmable apparatus 101 can also comprise one or more computers. In particular, the programmable apparatus 101 can be formed from a computer network which processes data in the form of a cloud. For this purpose, the programmable apparatus 101 can have the storage medium 115 already mentioned, in which the data of the digital twin data record 111 and the component model data records 112 of various configurations required for the creation thereof can be stored, for example in electronic or magnetic form. The programmable apparatus 101 can also have data processing options. For example, the programmable apparatus 101 can have a processor 117, by means of which data from all these component model data records 112 and the machine-readable program instructions 191 of the computer program product 189, in particular program instructions for creating or generating a three-dimensional digital twin data record 111, can be processed.

The programmable apparatus 101 can also have the device interface symbolically represented by the double arrow 119, via which interface data can be input into the programmable apparatus 101 and/or output from the programmable apparatus 101. The programmable apparatus 101 can also be implemented in a spatially distributed manner, for example when data are processed in a data cloud distributed over a plurality of computers.

In particular, the programmable apparatus 101 can be programmable, i.e. it can be prompted by a suitably programmed computer program product 109 to execute or control computer-processable steps and data of the method 151 according to the disclosure described in connection with FIG. 2.

The computer program product 109 can contain instructions or code which, for example, cause the processor 117 of the programmable apparatus 101 to store, read out, process and modify data generated by a detection apparatus 201, to set up a simulation environment for carrying out a simulation 141 (see FIG. 2) on the basis of the three-dimensional digital twin data record 111, to carry out optimization routines, etc. In particular, the computer program product 109 can be written in any computer language and can contain program instructions 107 that can be processed in the simulations 141 on the basis of the digital twin data record 111. The computer program product 109 can be stored on any computer-readable medium 105, for example a flash memory, a CD, a DVD, RAM, ROM, PROM, EPROM, etc. The computer program product 109 and/or the data to be processed thereby can also be stored on a server or several servers, for example a data cloud, from where they can be downloaded via a network, for example the Internet.

In order to be able to carry out the method 151 according to the disclosure shown in FIG. 2 for the digital documentation and simulation of a passenger transport installation 11, a detection apparatus 201 is used during the assembly work, as shown symbolically in FIG. 1, which apparatus comprises at least one central position analysis device PAG, at least one local position detection device PEG, at least one portable tool WZ having technical means for recording data from connection components VE installed with this tool WZ, together with their position and parameters which are measured by the portable tool WZ during installation; and a central data storage and data processing unit ZD, in which parameters for the documentation and simulation of the passenger transport installation 11 are stored. The detection apparatus also optionally has a provision system BSS, which outputs connection components VE based on the assembly process for assembly of the components of the passenger transport installation 11.

FIG. 2 thus describes the elements of the detection apparatus 201 shown in FIG. 1, its communication connections, communication networks and their interaction, as well as the method 151 that can be carried out with these elements, divided into steps S1 to S12.

The detection apparatus 201 comprises in particular the following elements:

A central position analysis device PAG, in which data determined by a tool WZ1, WZ2, . . . , WZn of the detection apparatus 201 are analyzed, compiled to form installation data records DS and assigned to the correct interfaces 135.

At least one local position detection device PEG1, . . . , PEGn, which is uniquely assigned to a central position analysis device PAG.

At least one portable tool WZ1, WZ2, . . . WZn having technical means for recording data from connection components VE, VE1 installed with this tool WZ1, WZ2, . . . , WZn.

A central data storage and data processing unit ZD in which parameters for the documentation and simulation of the passenger transport installation 11 are stored.

Optionally a provision system BSS for providing connection components VE, VE1

Optionally at least one portable display device DG for assisting fitters.

In the following text, elements of the detection apparatus 201 and the connection components VE, VE1 that occur more than once are specifically differentiated for reasons of clarity with regard to their reference signs only if they are associated with the exemplary assembly process of the connection component VE1. In general, the tool has the reference sign WZ, the local position detection device has the reference sign PEG, and a connection component has the reference sign VE.

Since the elements of the detection apparatus 201 to be arranged in the building 3 are only required during the assembly of the passenger transport installation 11, the central position analysis device PAG and the at least one position detection device PEG as well as the tool WZ and the optional components are preferably designed to be portable and removable from the building 3. The central data storage and data processing unit ZD can be established in the programmable apparatus 101, as shown in FIG. 2.

A communication connection is set up between the above-mentioned elements of the detection apparatus 201, via which connection the data, recorded and generated by the tool WZ, of a connection component VE installed with this tool WZ are transmitted via the at least one local position detection device PEG and the central position analysis device PAG to the central data storage and data processing unit ZD. The central data storage and data processing unit ZD enters this data, preferably processed as an installation data record DS, into the digital twin data record 111 in a position-defined manner.

The communication connection between the tool WZ and the central data storage and data processing unit ZD can have the following architecture:

A first wireless or wired communication connection K1A, K1B between the central position analysis device PAG and the central data storage and data processing unit ZD, with this being established, according to method step S1, either via a communication module 43 of the controller 41 of the passenger transport installation 11 or via a direct Internet connection;

A second communication connection K2, which is established between the central position analysis device PAG and the at least one local position detection device PEG according to the illustrated method step S2; and A third wireless or wired communication connection K3, which is established, according to the illustrated method step S3, between a local position detection device PEG and the portable tool WZ to be connected thereto, with each portable tool WZ being uniquely assigned to a position detection device PEG.

The detection apparatus 201 is preferably set up in the building 3 before the actual installation of the passenger transport installation 11. Here, as shown in FIG. 1, at least the central position detection device PEG of the detection apparatus 201 is arranged at a suitable position in the region of the passenger transport installation 11 to be created in the building 3. If the position detection device PEG is not fixedly connected to the tool WZ, it can be arranged at a distance from the position analysis device PAG in the region of the passenger transport installation 11 to be created.

Because of the geometric and electrical conditions and restrictions in buildings 3, such as reinforced concrete parts through which wireless signals cannot be transmitted or are transmitted only poorly, localization of the installed connection component VE from outside the building 3, for example using the GPS system, is almost impossible. In addition, it would hardly be possible to determine the installation position POS of the installed connection component VE1 with the precision required for simulations. It is therefore advantageous to divide the communication connection between the tool WZ and the central data storage and data processing unit ZD, as already mentioned and shown in FIG. 2, into a plurality of separate communication connections K1A, K1B, K2, K3 and to use the elements of the detection apparatus 201 temporarily installed to a certain extent as a local GPS system within the building 3.

In order to establish the first wireless or wired communication connection K1A, the central position analysis device PAG can be connected to a bus or an interface of the controller 41 of the passenger transport installation 11 using a suitable cable. The connection of the central position analysis device PAG by means of a suitable cable to a bus or an interface of the passenger transport installation 11 has the advantage that this wired connection increases protection against manipulation of the installation. On the other hand, wirelessly implemented communication paths or partial communication paths may be necessary if longer distances have to be covered between the central position analysis device PAG and the controller 41 of the passenger transport installation 11, where a cable connection poses a risk to occupational and operational safety.

A communication module 43 is integrated in the controller 41 or connected thereto, via which module data can be exchanged between the central position analysis device PAG and the central data storage and data processing unit ZD. The communication between the communication module 43 and the central data storage and data processing unit ZD can be wireless, but can also be wired in large installations or for security reasons. For safety reasons, the installation data records DS can alternatively also first be uploaded to a portable computer belonging to the fitter, which then transmits the data via the communication module 43 to the central data storage and data processing unit ZD. Furthermore, the separation between the communication connections offers the possibility of aggregating the installation data records DS in the central position analysis device PAG before further data transmission and the change of communication technology.

In a further advantageous embodiment, the first communication connection K1B between the central position analysis device PAG and the data storage and data processing unit ZD can also have completely wireless communication paths or partial communication paths, with the central position analysis device PAG having communication means (not shown in detail) for this purpose, by means of which the central position analysis device PAG can be connected directly to a transmission network, for example a cellular network. Data can be transmitted substantially wirelessly between the central position analysis device PAG and the data storage and data processing unit ZD via this communication connection K1B.

For the reasons already discussed above, the second communication connection K2 can technically be implemented in a wireless or wired manner. It is only important that each local position detection device PEG is uniquely assigned to a central position analysis device PAG. The separation between the first and second communication connections K1A, K2 or K1B, K2 allows one communication connection to be wireless and the other to be wired. This separation also allows a switch between wireless communication technologies such as Bluetooth, NfC, infrared, RFID, Wi-Fi, wireless HART, wireless USB or ZigBee depending on the geometric and electrical conditions and restrictions in the buildings 3 surrounding the passenger transport installations 11. The separation between the communication connections naturally also offers the possibility of aggregating the installation data records DS before further data transmission in the local position detection devices PEG.

The third wireless or wired communication connection K3 is established between a local position detection device PEG and the respectively connected portable tool WZ, with each portable tool WZ being uniquely assigned to a position detection device PEG. For the reasons and advantages already discussed in detail above, this third communication connection can also be technically implemented in a wireless or wired manner. Alternatively, the local position detection device PEG can be integrated in the relevant portable tool WZ. As indicated, a plurality of tools WZ1, WZ2, . . . , WZn and a plurality of local position detection devices PEG1, PEG2, . . . , PEGn can of course be used on the construction site for assembly.

As soon as the communication connections K1A, K1B, K2, K3 have been established, as explained above, the assembly of the components 29, 39 of the passenger transport installation 11 can begin. Since these components 39 55 were produced in accompaniment to the digital twin data record 111, this logically also already exists. The generation and position-defined entry of the installation data records DS into the digital twin data record 111 then takes place on the central data storage and data processing unit ZD according to method steps S4 to S12 explained below, which are also shown in FIG. 2. Step S4 is subdivided into sub-steps S4A to S4C.

Representing at least some connection components VE of the passenger transport installation 11, a possible sequence of the method 151 according to the disclosure is described in more detail below with reference to the connection component VE1 shown in FIG. 2.

Since, as shown in FIGS. 1 and 2, the installation data record DS1 contains the installation data of the assigned connection component VE1, which connects the two components 39, 55 of the passenger transport installation 11 to one another and to the building 3 via connection component receptacles 35, this installation data record DS1 can be assigned to the corresponding interface 135 in the digital twin data record 111. The connection component receptacles 35 thus serve as interfaces for the components 39, 55.

The position-defining, spatial coordinates or the installation position POS of the relevant installation data record DS can relate to a reference point RP of the digital twin data record 111 (see FIG. 1), the reference coordinates x', y' of which, for example to a buffer component model data record 165, correspond to the measured coordinates x, y of the buffer 21 to the position analysis device PAG. Of course, further options can also be used here in order to create a position-defining relationship between the physical passenger transport installation 11 and the three-dimensional, virtual model of the digital twin data record 111.

If a portable display device DG is present, an activity to be carried out by a fitter can be displayed on this portable display device DG in a sub-step S4A. The information displayed is part of an assembly or installation specification, which is preferably stored in the digital twin data record 111 in the central data storage and data processing unit ZD.

The activity to be carried out in each case, which is defined according to the assembly specification MS or installation specification for the relevant pending assembly step, is displayed to a fitter on the portable display device DG. Such an instruction may read, for example: "Using the connection component VE1, fasten a component 55 together with a second component 39 to the building 3 at a specific installation position POS x, y, z in the installation space of the building 3 and tighten this connection with a predetermined torque M".

If a provision system BSS is present, the connection component VE1 required for the activity described above can automatically be provided by the provision system BSS based on the assembly specification MS in a next sub-step S4B. In this sub-step S4B, corresponding control signals are transmitted from the central data storage and data processing unit ZD to the provision system BSS.

In a next step S4C, the displayed connection component VE1 is installed together with the components 39, 55 of the passenger transport installation 11 in the building 3 at the specified location by the fitter using the portable tool WZ2. The tool WZ2 and/or the local position detection device PEG and/or the central position analysis device PAG can have a pointer PT that marks the specified installation position in the installation space of the building 3, for example using a laser beam. The data required for this can be transmitted from the central data storage and data processing unit ZD to the pointer PT via the established communication connections K1A, K1B, K2, K3. As shown, the local position detection device PEG2 can be integrated in the tool WZ2, so that the communication connection K3 takes place over a very short distance here.

In the example shown, the fitter uses the connection component VE1 to fasten the two components 39, 55 in the building 3 via the connection component receptacles 35 thereof with a predetermined torque M. The torque M specified in the specification can be automatically transmitted to the tool WZ2 in order to trigger the triggering mechanism thereof. This avoids further sources of error during installation.

In a next step S5, an identifier ID for the installed connection component VE1 is determined by the tool WZ2 and the installation position POS and the installation parameters EP are measured by the portable tool WZ2 during installation.

An identifier ID can be determined, for example, by means of a suitable reading device, which can record a unique marker of the connection component VE1. If the connection component VE1, as occurs in most cases, does not have a one-to-one marker, the identifier ID can also be assigned continuously by the tool WZ. The components 39, 55 to be assembled of the passenger transport installation optionally have markers MK1, MK2, which can also be detected by the tool WZ. The detection of the markers MK1, MK2 allows a continuous check based on the digital twin data record 111 as to whether the correct components 39, 55 are actually installed at the corresponding installation position.

The installation position POS can be measured using position determination sensors, such as GPS-based sensors, which are arranged, for example, in the tool WZ2 and/or in the local position detection device PEG and/or in the central position analysis device PAG. GPS-based triangulation methods or differential GPS are preferably used here. Alternatively, the installation position can be measured using laser-based position determination methods, preferably using laser-based position determination sensors that communicate with one another. Of course, the position determination sensors (not shown in detail) can also be independent elements of the detection apparatus 201 and can be connected to the tool WZ and/or local position detection device PEG and/or central position analysis device PAG via their own communication connections.

In the illustrated example, the fitter uses the tool WZ2 to determine an identifier ID for the installed connection component VE1 and detects its installation position POS in the building 3, for example via the position of the tool WZ2 relative to the central position analysis device PAG when the specified torque M or breakaway torque of the connection component VE1 designed as a screw is reached. In addition, said fitter uses the tool WZ to measure installation parameters EP, such as the torque M applied at the end of the screwing process.

In a next step S6, which takes place after or during the screwing process, documentation DK of the installation can be created by the tool WZ2. The documentation DK can take place, for example, by means of a camera 57 and optionally by extracting features from the camera images. Matches and/or differences between the actual information read from the camera images regarding the installed components and, if applicable, their installation, on the one hand, and the target specifications from the digital twin data record 111, on the other hand, can be determined and these can be added to the installation data record DS as documentation DS.

In a next step S7, the installation data record DS1 is preferably compiled in the local position detection device PEG2, which is assigned to the portable tool WZ2 with which the corresponding connection component VE1 was installed. The installation data record DS1 comprises at least the determined identifier ID for the installed connection component VE1, its measured position POS, its measured installation parameters EP and optionally the documentation DK. If necessary, multiple installation data records DS are aggregated on the local position detection device PEG2 before further data transmission.

In a next step S8, the installation data records DS are transmitted from the at least one local position detection device PEG1, PEG2, . . . , PEGn to the central position analysis device PAG via the second communication connection K2.

With this transmission via the second communication connection K2, a switch between wireless communication technologies such as Bluetooth, NfC, infrared, RFID, Wi-Fi, wireless HART, wireless USB or ZigBee can take place depending on the geometric and electrical conditions and restrictions in the installation spaces of passenger transport installations 11 in the buildings 3.

In a next step S9, the installation data records DS can be transmitted from the central position analysis device PAG to the central data storage and data processing unit ZD directly via the first communication connection K1B. If necessary, multiple installation data records DS are further aggregated on the central position analysis device PAG before transmission. A change between the above-mentioned wireless communication technologies can also take place with this first communication connection K1B. Alternatively, as also shown in FIG. 2, the first communication connection K1A can also be made via a communication module 43 of the controller 41 of the passenger transport installation 11 to the data storage and data processing unit ZD. In this case, the installation data records DS can also be stored in a local data store LS of the controller 41 in order to persistently link these to the passenger transport installation 11 as digital assembly documentation.

In a next step S10, there is position-defined entry of the installation data records DS and the associated metadata, in particular log data, into the fields provided therefor in the digital twin data record 111, which is provided for this purpose on the central data storage and data processing unit ZD.

In this case, the installation data records DS and associated metadata are further processed using the data of the digital twin data record 111. The installation data record DS can be assigned to the relevant interface 135 and stored in the digital twin data record 111. In addition, based on the measured position POS, the actual spatial position of the relevant interface 135 and the component model data records 112 connected to one another at this interface 135 can be tracked in virtual, three-dimensional space with respect to the originally defined target position, so that a more precise match of the digital twin data record 111 with the passenger transport installation 11 mapped thereby is achieved. Characterizing properties of component model data records 112 may also be subject to changes as a result of the data in the installation data record DS, so that these characterizing properties are re-determined through simulations (see steps S11 and S12 below) and calculations and the previous characterizing properties in the corresponding component model data records 112 can be updated.

The digital twin data record 111 can be represented in the central data storage and data processing unit ZD by a database DB with appropriate data structures. Alternatively, the digital twin data record 111 and/or the installation data records DS and associated metadata can be represented by XML documents with appropriate grammars, for example in XSD. The data storage and data processing unit ZD thus contains a digital twin data record 111 having at least one design specification, its parameterization, the installation or assembly specification MS for the passenger transport installation 11 to be installed and, for each connection component VE, data fields for the data of the associated installation data record DS.

As already mentioned, the data storage and data processing unit ZD can be technically implemented by a remote system or a programmable apparatus 101, in particular by a cloud memory for the data storage unit and a cloud computing system or hosted server for the data processing unit. As explained in step S9, it is possible to store the installation data records DS locally in a local persistent data store LS, which is connected to the controller 41 of the passenger transport installation 11. In this case, this local data store LS is regularly synchronized with a data store in the programmable apparatus 101. Such data synchronization between local and remote data storage is common in cloud solutions at user-defined times, such as every 10 minutes or once an hour or a day depending on the rate of change of the data.

In a next step S11, by means of the data of the digital twin data record 111 and the installation data records DS, a simulation 141 of the behavior, the forces and moments of each installed connection component VE in interaction with the other physical components of the passenger transport installation 11 can be carried out in order to determine material changes and material stresses that are outside predefined tolerance ranges, the simulation taking place on the data storage and data processing unit ZD.

The simulation 141 of the behavior, the forces and moments can be carried out using common software solutions such as MATLAB, SIMULINK or MAPLE with the aid of programs for calculating finite elements. As already explained above, the simulation 141 can also take place on cloud computing systems or hosted servers. Such solutions scale better than local computing capacities because the computing capacities only have to be provided and paid for for the time of the simulation 141. FIG. 2 symbolically shows a simulation 141 of the assembled connection component VE1 with an exaggerated depiction of the connection component receptacles 35 being crushed due to an excessively high applied torque M.

This means that the installation data records DS recorded during assembly and entered into the digital twin data record 111 can also influence at least one characterizing property of at least one component model data record 112, or this characterizing property of the component model data record 112 must be updated accordingly. In concrete terms, this means that an installation data record DS usually relates to a plurality of characterizing properties from a plurality of component model data records 112. By means of the simulations 141, changes of each of these characterizing properties can be calculated for each affected component model data record 112 from the recorded installation parameters EP of the tool WZ using the geometric relationships available in the digital twin data record 111, the physical properties stored in the component model data records 112, and known calculation methods from the fields of physics, mechanical engineering and the science of strength of materials. The changed characterizing properties of the affected component model data records 112 determined on the basis of the recorded installation data records DS can now be assessed to determine whether the assembly was carried out correctly or not at this point. In concrete terms, for example, if a screw is tightened too much, a plastics damping element that is also compressed therewith could be damaged. Corresponding simulations 141 can thus be carried out with the data measured by the tool WZ, which are transmitted in a position-related manner to the digital twin data record 111 as the installation data record EP.

In a next step S12, correction work can be determined based on the material changes and material stresses determined by the simulation 141.

If the simulation 141 of the behavior, the forces and moments of the installed connection component VE in interaction with the other physical components 39, 55 of the passenger transport installation 11 result in material changes and stresses that are outside predefined tolerance ranges, corrective work can be initiated immediately after the faulty assembly, which analyzes the corresponding components 39, 55 and replaces them if necessary. These proactive measures make it possible to avoid longer unplanned downtimes of the passenger transport installation 11 and spare parts can be delivered at an early stage to rectify these assembly errors.

Due to the position detection described, it is also unambiguously clear which damping element still has to be replaced before the physical passenger transport installation 11 is put into operation. In this way, consequential damage to other components that might occur during startup can be avoided. In addition, the components damaged by the faulty assembly could also affect adjustments made to the passenger transport installation 11 before or during startup, which could lead to higher energy consumption and higher wear during subsequent operation, for example.

It is also possible that components of the passenger transport installation 11 have to be adjusted before assembly or even during assembly. Such adjustments may be, for example, a braking torque in the case of a safety brake of an elevator or a maximum permissible speed in the case of speed monitoring. These adjustments can also be stored as data in the digital twin data record 111 and later read out and used in simulations 141.

Furthermore, a log 261 can be output, which specifies the component-specific information that has been read out and, if applicable, the installation-specific information for all components or for selected, in particular function-critical components of the passenger transport installation 11. In other words, the information determined as part of the method 151 regarding the components of a passenger transport installation 11 installed in the building 3 can be entered as installation data records DS or parts thereof in the fields provided for this purpose in the digital twin data record 111 on the central data storage and data processing unit ZD and recorded in a log 261.

Such a log 261 can be output in a human-readable form. For example, the log 261 can be printed out as a list. In such a list, for example, all of the components 39, 55, VE, VE1 accommodated in the building 3 can be listed together with their installation-specific information or installation data records DS.

Alternatively, the log 261 may be created in a machine-readable manner, for example as an electronic log. In addition, the installation data records DS that have been read out can be compared with target specifications. In this case, a log 261 can also be output that, for example, lists matches and/or differences between the installation data records DS and the target specifications. The matches and/or differences with regard to the installation data records DS can be contained in the log 261 with regard to the component-specific information, or a separate log 261 with regard to the installation data records DS can be created.

It should be noted that some of the possible features and advantages of the disclosure are described herein with reference to different embodiments. A person skilled in the art will recognize that the features may be suitably combined, adapted or exchanged as appropriate in order to arrive at further embodiments of the disclosure.

Finally, it should be noted that terms such as "comprising," "having," etc. do not preclude other elements or steps and terms such as "a" or "an" do not preclude a plurality. Furthermore, it should be noted that features or steps which have been described with reference to one of the above embodiments may also be used in combination with other features or steps of other embodiments described above. Reference signs in the claims should not be considered to be limiting.

The invention claimed is:

1. A method for digital documentation and simulation of a passenger transport installation using a detection apparatus, that comprises:

a central position analysis device, at least one local position detection device, at least one portable tool configured to record data from connection components installed using the at least one portable tool, and position and installation parameters that are measured by the at least one portable tool during installation of the connection components, and a central data storage and data processing unit in which parameters for the digital documentation and simulation of the passenger transport installation are stored, the method comprising:

establishing a communication connection between the at least one portable tool, the at least one local position detection device, and the central position analysis device and the central data storage and data processing unit;

generating installation data records based on data of the installed connection components that are transmitted from the at least one portable tool via the at least one local position detection device and the central position analysis device to the central data storage and data processing unit, wherein an installation data record comprises at least one identifier for an assigned, installed connection component, a measured position for the installed connection component, and the installation parameters measured by the at least one portable tool; and entering the installation data records in a position-defined manner into a digital twin data record that maps the passenger transport installation.

2. The method of claim 1, further comprising:

establishing, by the detection apparatus, a first communication connection between the central position analysis device and the central data storage and data processing unit;

establishing, by the detection apparatus, a second communication connection between the central position analysis device and the at least one local position detection device, wherein each local position detection device is uniquely assigned to a central position analysis device; and establishing, by the detection apparatus, a third communication connection between the local position analysis device and the at least one portable tool;

assembling at least one component of the passenger transport installation in a building using a connection component using the at least one portable tool;

determining an identifier for the installed connection component using the at least one portable tool, measuring installation parameters using the at least one portable tool, and measuring the installation position of the connection component using the local position detection device during installation;

documenting the installation process using the at least one portable tool;

compiling an installation data record, which comprises the identified identifier for the installed connection component, its measured position, the measured installation parameters and the documentation, in at least one local position detection device associated with the at least one portable tool;

transmitting the installation data record from the at least one local position detection device to the central position analysis device via the second communication connection;

transmitting the installation data records from the central position analysis device to the central data storage and data processing unit via the first communication connection;

position-defined entry of the installation data records and associated metadata into fields provided therefor in the digital twin data record of the passenger transport installation, which is provided for this purpose on the central data storage and data processing unit.

3. The method of claim 2, wherein the first communication connection is established via a communication component of the passenger transport installation.

4. The method of claim 2, wherein the detection apparatus comprises at least one removable, portable display device for assisting fitters, and assembling at least one component of the passenger transport installation in the building further comprises:

displaying an activity to be carried out by a fitter on the portable display device, wherein this activity takes place using the portable tool and a connection component based on an assembly specification, which assembly specification is stored in the central data storage and data processing unit as part of the digital twin data record of the passenger transport installation.

5. The method of claim 4, wherein the detection apparatus comprises a provision system for connection components, and assembling at least one component of the passenger transport installation in the building further comprises:

automatically providing the connection component using the provision system based on the assembly specification; and installing the displayed connection component in connection component receptacles, which are provided for this connection component on components of the passenger transport installation or in the building in which the passenger transport installation is installed, by the fitter using the portable tool.

6. The method of claim 1, wherein the measuring of the installation position and the installation parameters is implemented using the portable local position detection device during installation by determining the position of the tool relative to the position of the central position analysis device and/or by determining current GPS data of the tool during an assembly process.

7. The method of claim 2, further comprising:

simulating, using the digital twin data record, forces and moments of the installed connection component in interaction with other components of the passenger transport installation in order to determine material changes and stresses that are outside predefined tolerance ranges, wherein the simulation takes place on the data storage and data processing unit; and determining correction work based on the determined material changes and material stresses.

8. The method of claim 1, wherein the installation data records are aggregated on the at least one local position detection device and/or on the central position analysis device.

9. The method of claim 2, wherein the documentation of the installation that has taken place is camera-based.

10. The method of claim 1, wherein the data storage and data processing unit for the documentation and simulation of the passenger transport installation comprises a design specification, its parameterization, an assembly specification and, for each connection component, data fields for the identifier, for the installation position, for the measured installation parameters and for the documentation; all combined in the digital twin data record.

11. The method of claim 1, wherein the data storage and data processing unit is implemented in a programmable apparatus.

12. The method of claim 11, wherein the programmable apparatus comprises a remote system.

13. The method of claim 11, wherein the programmable apparatus comprises a cloud-based system.

14. A non-transitory computer readable medium comprising instructions that, when executed by a processor, cause the processor to implement the method of claim 1.

15. A detection apparatus for carrying out the of claim 2, the detection apparatus comprising:

at least one local position detection device configured to;

establish the second communication connection between the central position analysis device and the at least one local position detection device, wherein each local position detection device is uniquely assigned to a central position analysis device; and establish the third communication connection between the local position analysis device and the at least one portable tool;

assemble the at least one component of the passenger transport installation in the building using a connection component using the at least one portable tool;

determine the identifier for the installed connection component using the at least one portable tool, measuring installation parameters using the at least one portable tool, and measuring the installation position of the connection component using the local position detection device during installation;

document the installation process using the at least one portable tool;

compile the installation data record, which comprises the identified identifier for the installed connection component, its measured position, the measured installation parameters and the documentation, in at least one local position detection device associated with the at least one portable tool;

transmit the installation data record from the at least one local position detection device to the central position analysis device via the second communication connection;

a central position analysis device configured to:

establishing the first communication connection between the central position analysis device and the central data storage and data processing unit;

transmit the installation data record from the at least one local position detection device to the central position analysis device via the second communication connection;

transmit the installation data records from the central position analysis device to the central data storage and data processing unit via the first communication connection;

at least one display device for assisting fitters;

at least one portable tool having technical means for recording an identifier for installed components together with their position and installation parameters which are measured by the portable tool during installation of the connection component;

a central data storage and data processing unit configured to:

provide position-defined entry of the installation data records and the associated metadata, in particular log data, into the fields provided therefor in the digital twin data record of the passenger transport installation, which is provided for this purpose on the central data storage and data processing unit;

simulate forces and moments of the installed connection component in interaction with other components of the passenger transport installation in order to determine material changes and stresses that are outside predefined tolerance ranges, wherein the simulation takes place on the data storage and data processing unit; and determine correction work based on the determined material changes and material stresses;

a communication connection can be set up between the tool, the at least one local position detection device, the central position analysis device and the central data storage and data processing unit, and a digital twin data record, which comprises a design specification, its parameterization, an assembly specification and, for each connection component, data fields for the identifier, for the installation position, for the measured installation parameters and for the documentation.

16. The detection apparatus of claim 15, further comprising a provision system for connection components, the provision system configured to;

automatically provide the connection component based on the assembly specification; and install the displayed connection component in connection component receptacles, which are provided for this connection component on components of the passenger transport installation or in a building in which the passenger transport installation is installed, by the fitter using the portable tool.

* * * * *